(12) United States Patent
Blaudin de the

(10) Patent No.: US 8,107,585 B2
(45) Date of Patent: Jan. 31, 2012

(54) FUEL ROD FOR A NUCLEAR REACTOR

(75) Inventor: François Blaudin de the, Saint Didier au Mont d'or (FR)

(73) Assignee: Areva NP, Courbevoie (FR)

( * ) Notice: Subject to any disclaimer, the term of this patent is extended or adjusted under 35 U.S.C. 154(b) by 875 days.

(21) Appl. No.: 10/583,626

(22) PCT Filed: Dec. 2, 2004

(86) PCT No.: PCT/FR2004/003103
§ 371 (c)(1),
(2), (4) Date: Apr. 10, 2007

(87) PCT Pub. No.: WO2005/071691
PCT Pub. Date: Aug. 4, 2005

(65) Prior Publication Data
US 2007/0242792 A1    Oct. 18, 2007

(30) Foreign Application Priority Data
Dec. 22, 2003 (FR) ..................... 03 15185

(51) Int. Cl.
*G21C 19/00* (2006.01)
*G21C 9/00* (2006.01)
*G21C 3/00* (2006.01)

(52) U.S. Cl. ........ 376/409; 376/285; 376/261; 376/305; 376/410; 376/420; 376/422

(58) Field of Classification Search ............... 376/261, 376/285, 305, 409, 410, 420, 422
See application file for complete search history.

(56) References Cited

U.S. PATENT DOCUMENTS

| | | | |
|---|---|---|---|
| 3,804,710 A * | 4/1974 | Bresnick | 376/451 |
| 4,046,631 A * | 9/1977 | Clapham | 376/451 |
| 4,111,748 A * | 9/1978 | Hayashi et al. | 376/412 |
| 4,120,752 A * | 10/1978 | Ocken | 376/426 |

FOREIGN PATENT DOCUMENTS

| | | |
|---|---|---|
| DE | 198 48 581 | 4/2000 |
| EP | 0169 422 | 7/1985 |
| NL | 7 702 531 | 9/1978 |

OTHER PUBLICATIONS

PCT International Search Report PCT/FR2004/003103, mailed 8/16/05.

* cited by examiner

*Primary Examiner* — Jack Keith
*Assistant Examiner* — Erin M Leach
(74) *Attorney, Agent, or Firm* — Davidson, Davidson & Kappel, LLC

(57) ABSTRACT

The nuclear reactor comprises a lower stopper sealingly fixed to a lower end of a tubular casing of the pencil that comprises a part which is internal to the casing successively comprising a first cylindrical section having a diameter which is substantially equal to the inner diameter of the tubular casing; a second cylindrical section whose diameter is smaller than the inner diameter of the tubular casing and a third cylindrical section whose inner diameter is smaller than the inner diameter of the tubular casing and greater than the diameter of the second cylindrical section such that 1-2 tenths of a millimetre radial play is created in the gas passable between the outer surface of the third section and the inner surface of the casing.

5 Claims, 3 Drawing Sheets

FUEL ROD FOR A NUCLEAR REACTOR

FIELD OF THE INVENTION

The invention relates to a fuel rod for a nuclear reactor which is cooled by water and in particular for a nuclear reactor which is cooled by means of pressurized water.

BACKGROUND INFORMATION

Nuclear reactors which are cooled by means of pressurized water comprise a core which is constituted by fuel assemblies, each fuel assembly itself being constituted by a cluster of fuel rods which are retained in a framework of the fuel assembly so that the rods, having a cylindrical form, have their axes mutually parallel.

Each of the fuel rods comprise a rectilinear cylindrical tubular cladding that has an axial length that is much greater than the diameter of the cross-section. Generally, the fuel rods have a length greater than 4 m and a diameter in the order of 10 mm. The fuel rods comprise, at the inner side of the tubular cladding a column of nuclear fuel pellets which are stacked one on top of the other in the axial direction of the cladding which is closed, in a tight manner, at the axial ends thereof by means of plugs. In its operating position within a fuel assembly inside the core of the nuclear reactor, the fuel rod is arranged with the axis thereof vertical so that a first closure plug of the rod is at the lower portion thereof and constitutes the lower plug and the second plug which is located at the upper portion of the fuel rod in the operating position, constitutes the upper plug.

The column of fuel pellets rests with a first lower end on an end surface of a portion of the lower plug that is engaged inside the cladding of the fuel rod. The column of fuel pellets is retained inside the fuel rod by means of a helical compression spring which is interposed between a second upper end of the column of fuel pellets and an end surface of an inner portion of the upper closure plug of the rod.

In order to perform the filling of the rods during their construction, it is possible to close one of the ends of the tubular cladding of the rod, for example, the first lower end, by engaging the lower plug in one end of the tubular cladding and fixing it to the cladding by means of welding. The fuel pellets which are stacked one on top of the other in the form of a column whose lower pellet rests on the lower plug of the rod are then introduced inside the cladding. The spring is then positioned and the upper plug is fixed, and the gases inside the cladding are then discharged, generally by means of a channel which is provided through the upper plug, an inert gas, for example, pressurized helium, is introduced inside the cladding of the rod, and the rod is closed in a tight manner by welding a seal weld to the end of the channel which extends through the upper plug.

Inside the rod, the fuel pellets are in contact with pressurized helium which reduces or prevents oxidation of the pellets. The inert gas fills all the portions of the cladding which are not occupied by the column of fuel pellets and the retention spring. In particular, pressurized helium fills the space which is provided between the upper end of the column of fuel pellets and the end of the inner portion of the upper plug in which the compression spring is arranged which retains the column of fuel pellets. This space constitutes a gas collection arrangement or plenum in which the gases discharged by the fuel pellets collect when the fuel rod is used in the core of a nuclear reactor. Some gases may be formed in particular by fission reactions of specific elements which are contained in the fuel pellets. The pressure at the inner side of the cladding of the rod therefore has a tendency to increase due to the gas being released by the column of fuel pellets. It is necessary to provide a plenum which has sufficient volume to prevent too strong an internal pressurization of the rod during operation.

With fuel rods that have pellets comprising a mixed oxide of uranium and plutonium or a mixture of oxides of uranium and plutonium (MOX fuel), the volume of the plenum between the upper portion of the column of fuel pellets and the end surface of the inner portion of the upper plug of the fuel rods is generally insufficient to completely ensure the tightness of the rod during operation. It is not possible to significantly increase the length of this space and therefore the length of the spring, which is not desirable in any case in so far as this extension of the upper plenum and the spring would cause the design of the rods to be modified and would require specific production of the constituent elements of the MOX fuel rods.

A conventional method for increasing the volume for expansion of the gases inside MOX fuel rods involves interposing, between the upper end surface of the lower plug inside the cladding and the first lower end of the column of fuel pellets, a cross-member or shim of stainless steel or zirconium alloy which is constituted by a tube that has a thick wall. In this manner, the MOX fuel rod comprises both an upper plenum and a lower plenum which extend between the lower end of the fuel rod and the upper end of the inner portion of the lower plug, which has the advantage of improving the diffusion of pellet gases towards the lower plenum which complements the upper plenum of the rod, balancing the hydraulic and thermal behaviour of the rod and reducing the operating temperature of the lower portion of the fuel rod.

However, this embodiment of MOX fuel rods has the disadvantage of requiring the production, the storage and the positioning of tubular shims during the industrial production of the fuel rods. Controlling the production is made more complex and controls must be performed if it is desirable to prevent any risk of a production fault, such as the omission of a shim, during the production of a rod.

It has also been proposed, for example, in EP-0 169 422 and JP 298 792 that there be provided, in lower or upper plugs of fuel rods, recesses which increase the expansion space for gases at the ends of the rod. Recesses of this type which extend both in the portion of the plug which is introduced into the cladding and in the portion of the plug outside the cladding lead to a significant modification of the design of the plugs. The increase in the expansion space due to the recesses which are machined in the plugs can be combined with the use of hollow cross-pieces inside the cladding between a plug and the column of fuel pellets.

SUMMARY

An objective of the invention is therefore to provide a fuel rod for a nuclear reactor which is cooled by water comprising a cylindrical tubular cladding, a column of nuclear fuel pellets that are stacked one on top of the other inside the tubular cladding, in the axial direction of the cladding, a first plug for tight closure of a first axial end of the cladding of the rod arranged at the lower portion of the fuel rod when the rod is in an operating position inside the nuclear reactor, the cladding of the rod having its axis vertical, and a second plug for tight closure of the second axial end of the cladding, the column of fuel pellets resting on an inner portion, inside the cladding, of the first plug, referred to as the lower plug, via a first lower end, and being retained inside the tubular cladding by a compression spring which is interposed between a second upper axial end of the column of fuel pellets and an inner end portion of the second plug, referred to as the upper plug, this fuel rod comprising a lower plenum which is obtained without using a tubular shim and without a recess being machined in the lower plug.

To this end, the inner portion of the lower plug engaged inside the tubular cladding successively comprises, in the axial direction and in the direction from the first towards the second end of the cladding, a first cylindrical portion which has a diameter that is substantially equal to the inner diameter of the tubular cladding, a second cylindrical portion which has a diameter that is smaller than the inner diameter of the tubular cladding and a third portion that has a diameter which is smaller than the inner diameter of the tubular cladding and which is greater than the diameter of the second cylindrical portion so that there remains, between the lateral outer surface of the third cylindrical portion and the inner surface of the tubular cladding, a radial clearance for passage of gas and a substantially planar end surface on which the first end of the column of fuel pellets rests, so that an annular space for expansion of gas is formed between the outer surface of the second portion of the inner portion of the lower plug and the inner surface of the cladding.

According to specific forms, taken in isolation or in combination:
- the third cylindrical portion of the inner portion of the lower plug of the fuel rod has a diameter that is slightly smaller than the inner diameter of the cladding, such that there remains, between the outer lateral surface of the third cylindrical portion and the inner surface of the tubular cladding, a radial clearance for assembly and passage of gas of between one and two tenths of a millimetre,
- the second cylindrical portion of the inner portion of the lower plug has a diameter of between 40% and 60% of the inner diameter of the tubular cladding and a length in the axial direction of between 8 and 10 times the inner diameter of the tubular cladding,
- at least a portion of the fuel pellets of the column of fuel pellets comprises plutonium oxide or a mixed oxide of uranium and plutonium,
- the fuel rod further comprises, in at least one zone of the second cylindrical portion, extending in an axial direction, at least one cross-member which is constituted by a diametrically widened cylindrical portion of the second cylindrical portion that has an outer diameter that is substantially equal to the inner diameter of the tubular cladding that is reduced by an assembly clearance.

BRIEF DESCRIPTION OF THE DRAWINGS

In order to gain a better understanding of the invention, a fuel rod according to the prior art and a fuel rod according to the invention used as a MOX fuel rod will now be described by way of non-limiting example, with reference to the appended drawings.

DETAILED DESCRIPTION

Figure 1:
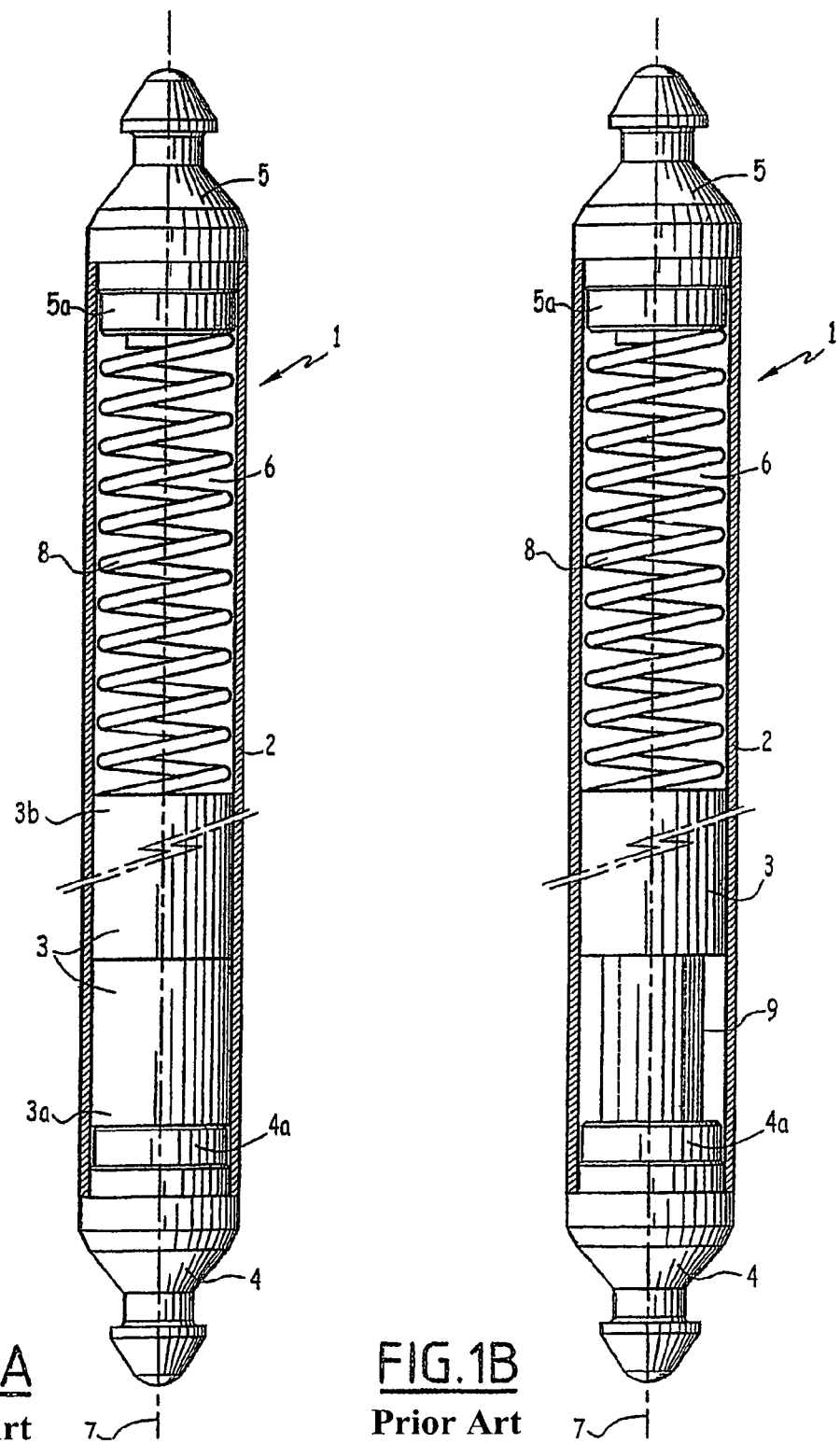
FIG. 1A is a partial axial section of a fuel rod according to the prior art.
FIG. 1B is a partial axial section of a MOX fuel rod according to the prior art.

FIG. 1A illustrates a fuel rod of a pressurized water nuclear reactor which is generally designated 1.

The fuel rod 1 comprises a tubular cladding 2 which comprises a column of fuel pellets 3 which is closed at a first axial end with a first plug 4 and at a second axial end with a second plug 5, respectively. The tubular cladding 2 is constituted by a tube of zirconium alloy which has a length greater than 4 m and an inner diameter smaller than 10 mm.

The fuel pellets 3 which are generally of a cylindrical form have a diameter which is substantially equal to the inner diameter of the tubular cladding 2, taking into account a very slight diametrical clearance which, at one side, allows the fuel pellets to be readily engaged inside the cladding when the rod is filled and allows the interactions between the lateral surfaces of the pellets and the cladding to be minimized when the pellets expand under the effect of radiation when the rod is in an operating position in the core of a nuclear reactor.

The column of fuel pellets rests, with the lower end thereof (lower surface of the first fuel pellet 3a) on a substantially planar end surface of an inner portion 4a of the plug 4 which is engaged inside the tubular cladding 2.

The fuel pellets 3 are stacked one on top of the other at the inner side of the cladding 2 in the direction of the axis 7 of the tubular cladding that constitutes the vertical axis of the rod in an operating position.

The upper end of the column of fuel pellets constituted by the upper surface of the fuel pellet 3b arranged at the upper portion of the pellet column is at a given distance from the end surface of an inner portion 5a of the upper plug which is engaged inside the cladding 2, when the rod is closed, so that a free space 6 is provided between the end of the fuel column and the end surface of the inner portion of the upper plug 5. In the free space 6, there is arranged a helical spring 8 which is compressed when the upper plug 5 is positioned between the end surface of the inner portion 5a of the upper plug 5 and the upper end of the column of fuel pellets 3.

The lower plug 4 and upper plug 5 whose inner portions have a diameter which is substantially equal to the inner diameter of the cladding 2 are engaged in the first and in the second end portions of the cladding 2, respectively, are welded to the cladding, for example, by welding using a laser beam.

After welding the upper plug 5, the gases contained in the cladding 2 are discharged via a channel which extends through the plug 5 and are replaced by pressurized helium which prevents any oxidation of the fuel pellets when the rod is used in the nuclear reactor. After filling with pressurized helium, the end of the channel or seal weld is closed by welding.

When the fuel rod 1 is in the operating position inside the nuclear reactor, the axis 7 of the rod is vertical, the first end of the rod closed by the first plug, or lower plug, is at the lower portion of the rod and the second end portion of the fuel rod closed by the second rod or upper rod 5 is at the upper portion of the rod.

When the rod is used in a nuclear reactor, the gases which are formed in the pellets of the fuel road are released and collect in the plenum 6 that has a volume that is generally sufficient to limit a pressure rise up to an excessive level inside the cladding 2 of the rod.

With MOX fuel rods, for example, rods that have fuel pellets 3, or at least a portion of the pellets, that comprise plutonium oxide, the use of a single upper plenum 6 is generally found to be insufficient and a lower plenum is produced by interposing a tubular shim that has a thick wall (for reasons of mechanical and thermal strength) between the first end, or lower end, of the pellet column and the end surface of the inner portion 4a of the lower plug 4.

FIG. 1B illustrates a tubular shim 9 which delimits a lower plenum in the rod 1 and which is substituted for fuel pellets in the lower portion of the column of pellets 3.

The disadvantages of using a shim or a tubular cross-member of this type are set out above.

Figure 2:
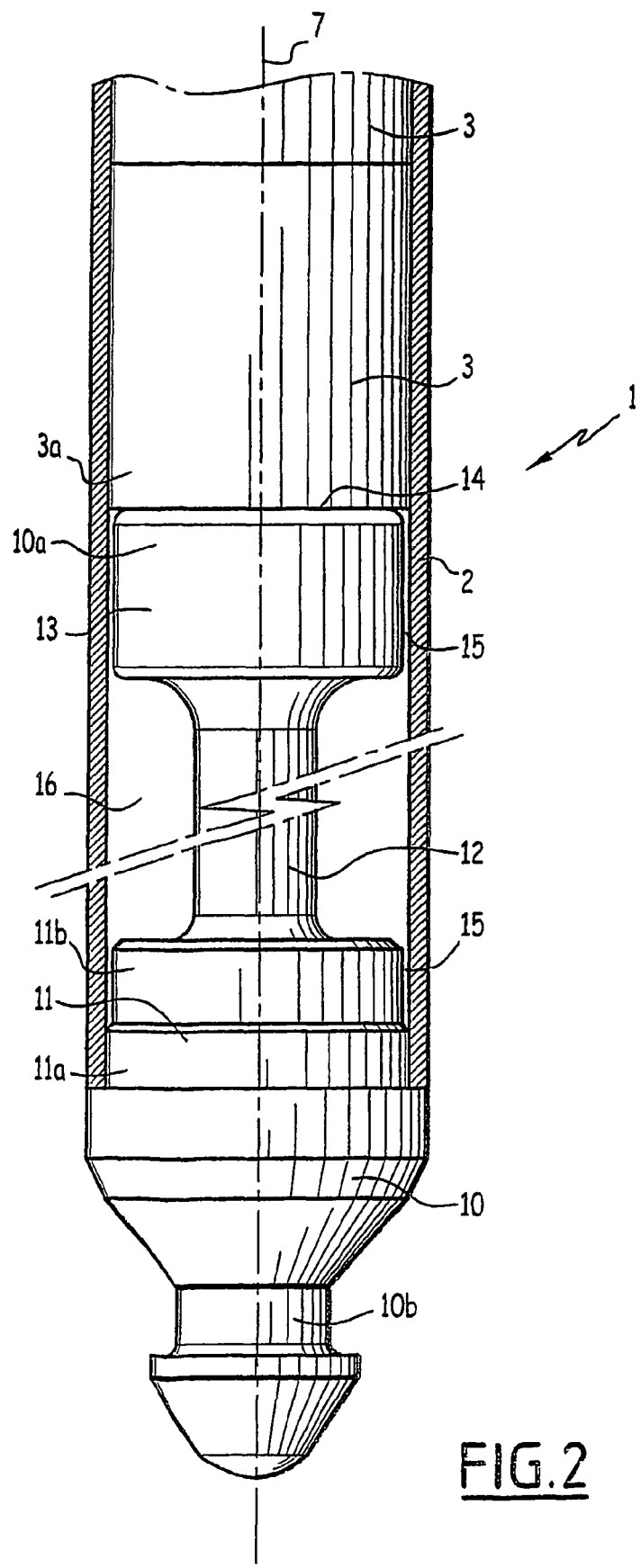
FIG. 2 is a partial axial section of a lower portion of a fuel rod according to the invention.

FIG. 2 illustrates the lower portion of a fuel rod according to the invention which can be used as a MOX fuel rod. Corresponding elements illustrating a fuel rod according to the prior art in FIGS. 1A and 1B and illustrating the lower portion of a fuel rod according to the invention in FIG. 2 are referred to by the same reference numerals.

The fuel rod 1 according to the invention, that has a lower portion that is illustrated in FIG. 2, differs from the rod 1 according to the prior art illustrated in FIG. 1 only in terms of the shape in which its lower plug 10 is formed.

The lower plug 10 of the fuel rod according to the invention may advantageously be produced in one piece, for example, by machining a blank of zirconium alloy.

If the rod 1 according to the invention is a MOX rod, for example, if the fuel pellets 3 of the rod comprise plutonium oxide, the shape of the plug 10 that will be described below prevents a shim or tubular cross-member 9 from having to be used.

The lower plug 10 of the rod 1 according to the invention comprises an inner portion 10a which is introduced inside the first end of the cladding 2 and an outer portion 10b which remains at the outer side of the cladding after the lower plug has been positioned. The plug 10 is generally generated by means of revolution about the axis 7 of the rod. The outer portion 10b has a rounded end and a groove which allows the rod to be gripped by a manipulation grab. The upper plug of the rod which is similar to the upper plug 5 of the rod according to the prior art, illustrated in FIG. 1, also comprises a gripping groove and a rounded end. The fuel rods can thus be taken up by a manipulation machine having a grab, both by the upper end thereof and by the lower end thereof.

The inner portion 10a of the plug 10 introduced inside the cladding when the plug is placed in position comprises three successive portions 11, 12, 13 in the axial direction 7 of the plug and the fuel rod, which are generally of cylindrical form and which are distinguished from each other in particular by the outer diameter thereof.

The first portion 11 of the portion 10a that is engaged via the first end of the cladding 2 in the lower portion thereof and the third portion 13 that is arranged furthest inside the cladding 2 towards the second end thereof both have a diameter which is substantially equal to or slightly smaller than the inner diameter of the cladding 2. A diameter which is substantially equal to the inner diameter of the cladding 2 in this instance is understood to be a diameter which is completely equal to the inner diameter of the cladding 2, a diameter which is very slightly greater than the inner diameter of the cladding 2 in order to produce a forced engagement of the plug, or a diameter that is very slightly smaller than the inner diameter of the cladding and that differs from this diameter only by a clearance that allows gas to pass around the plug.

The second intermediate portion 12 of the plug 10 has a diameter that is substantially smaller than the inner diameter of the cladding 2. For example, for a cladding that has an inner diameter that is slightly greater than 8 mm, the intermediate portion 12 of the plug 10 may have a diameter in the order of 4 mm. The diameter of the intermediate portion 12 of the inner portion 10a of the plug may be between 40% and 60% of the inner diameter of the cladding.

The first portion 11 of the inner portion 10a of the plug 10 has two successive portions whose diameter is substantially equal to the inner diameter of the cladding 2, as defined above.

A first portion 11a of the portion 11 has a diameter such that the plug is introduced slightly with force inside the cladding 2, when it is positioned, in order to provide a very good positioning of the plug, and in particular the welding shoulder thereof, at the end of the cladding 2 in the machine for welding the plugs. The first portion 11 also comprises a second portion 11b that has a diameter that allows a very small assembly clearance 15 to be provided (for example, in the order of a tenth of a millimetre) between the outer surface of the portion 11b of the portion 11 and the inner surface of the cladding 2.

The third portion 13 of the inner portion 10a of the plug has an outer diameter which is slightly smaller than the diameter of the portion 11b of the portion 11 and therefore provides, with the inner wall of the tubular cladding 2 of the rod, after the plug 10 has been positioned, a clearance 15 which allows gas to pass which is from the column of fuel pellets 3 at the periphery of the third portion 13. The radial clearance between the third plug portion and the cladding may be, for example, on the order of 0.15 mm and more generally between one and two tenths of a millimetre. The third portion 13 comprises a substantially planar end surface 14 on which the first pellet, or lower pellet 3a, of the fuel pellet column of MOX fuel rods comes to rest.

The third portion 13 may have, as an alternative, a diameter that is substantially smaller than the inner diameter of the cladding; however, the diameter of the third portion 13 is always substantially greater than the diameter of the second portion 12.

Because the intermediate portion 12 has an outer diameter which is substantially smaller than the inner diameter of the cladding 2, an annular free space 16 is provided between the outer surface of the second intermediate portion of the inner portion 10a of the plug 10 and the inner surface of the tubular cladding 2. This annular space 16 is in communication, via the annular space 15 that is provided between the third portion 13 of the inner portion 10a of the plug 10 and the inner surface of the cladding, with the space of the rod comprising the fuel pellets 3.

Consequently, the pressurization gas (generally helium) and the gases released by the fuel pellets during operation may fill the space 16 that constitutes an expansion space for the gases and therefore a collection arrangement or plenum that complements the upper plenum 6 (produced in the same manner as the upper plenum of the rod according to the prior art illustrated in FIG. 1).

The length of the second intermediate portion 12 of the inner portion 10a of the plug 10 is determined such that the volume of the complementary plenum 16 is sufficient to perform the desired functions with regard to the expansion of the gases in the MOX fuel rod during operation in the nuclear reactor. This length may be, for example, from 8 to 10 times the inner diameter of the cladding of the rod.

A length of the intermediate portion in the order of 70 mm, taking into account the diameters of the cladding and the intermediate portion mentioned above allows a free space to be reserved which constitutes the plenum 16 having a volume in the order of 3000 mm$^3$.

A lower plenum of this type best performs the functions of a plenum that complements an upper plenum 6 which is similar to the upper plenum of a rod according to the prior art.

Figure 3:
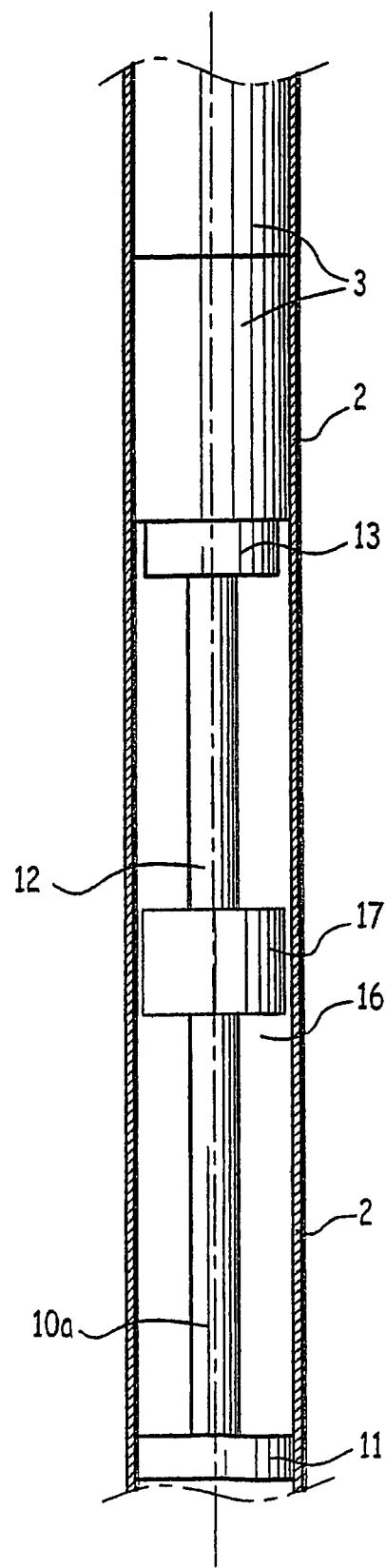
FIG. 3 is a schematic axial section of the inner portion of the lower plug of a fuel rod according to the invention introduced inside the tubular cladding, when the plug is placed in position.

FIG. 3 schematically illustrates the inner portion 10a of the plug that comprises the cylindrical portions 11, 12 and 13, the intermediate portion 12 allowing, over the entire length thereof, the annular space 16 to be provided in the lower end portion of the fuel rod.

Furthermore, the plug 10 comprises, by way of a variant, a cross-member 17 that is constituted by a diametrically widened portion of the portion 12 that may be in a central zone of the portion 12 which is substantially equidistant from the cylindrical portions 11 and 13. The cross-member 17 that has an outer diameter that has a length that is equal to the inner diameter of the cladding 2 reduced by an assembly clearance guides the central portion of the plug inside the cladding 2, allows gas to pass through and prevents scorching of the cladding 2 during operation. It is possible to provide a plurality of cross-members similar to the cross-member 17 which are distributed along the length of the intermediate portion 12.

The lower plug 10 of the rod comprising an inner portion 10a which is extended extensively has a very different shape from a plug according to the prior art. However, the positioning and the fixing of the lower plug are performed in the same manner as with a lower plug of a fuel rod according to the prior art. The outer portion 10b of the plug that terminates in a separation shoulder with the inner portion 10a, along which the welding operation for sealing the lower plug is performed, is similar to the outer portion 4b of a lower plug 4 according to the prior art, as illustrated in FIG. 1.

The reduction in the length of the pellet column owing to the extension of the inner portion 10a of the lower plug 10 is compensated for by a slight increase in the enrichment of the nuclear fuel which is produced in particular in the case of MOX fuel.

Due to the very different shapes and dimensions of the lower and upper plugs with fuel rods according to the invention, there is no risk during production of the two types of plug becoming mixed and confused when they are placed in position. A number of production incidents have been recorded in the past due to confusion between lower and upper plugs.

The elimination of shims or tubular cross-members for reserving a lower plenum of the MOX fuel rods allows economies to be made in terms of production of these shims and operations for positioning and controlling the shims during production of the fuel rods. Risks connected with the shims being forgotten during production of the MOX fuel rods are also eliminated. It is also very simple to increase the volume of the free space that constitutes the lower plenum of the rod by increasing the length or by reducing the diameter of the intermediate portion of the inner portion of the lower plug. The diameter of the intermediate portion may be a great deal smaller than the inner diameter of the cladding, the only limit to the reduction of this diameter being imposed by the mechanical strength of the lower plug in the fuel rod during operation in the nuclear reactor.

Thermomechanical analyses of this new design of lower support plug have shown that it complies with all the criteria which prevent the following methods of damage: instantaneous and inconsistent excessive deformation and plastic instability and, in particular, spontaneous and inconsistent scorching of the portion of the plug having the smallest diameter.

Furthermore, the lower plug of a fuel rod according to the invention does not bring about deformation of the cladding and provides excellent support and positioning for the fuel pellet column.

The invention is not strictly limited to the embodiment which has been described.

In this manner, the inner portion of the lower plug of the fuel rod may have a different shape from that which has been described, it being possible in particular for the shape and the dimensions of the intermediate portion to be different from the shapes and dimensions indicated above.

In the same manner, the first portion and the second intermediate portion may have any length in the axial direction and any shape which allows the end of the tubular cladding to be closed in a tight manner relative to the first cylindrical portion and the fuel pellet column to be supported relative to the third cylindrical portion. The third cylindrical portion may have a smaller diameter than the inner diameter of the cladding which has a length which is substantially greater than a simple clearance as described above.

The cladding and the plugs of the fuel rod according to the invention are generally produced in zirconium alloy but it is possible to envisage other materials, depending on the use of the fuel rod.

The invention can be used not only for fuel elements for a pressurised water nuclear reactor but also for any fuel element for nuclear reactors which are cooled with water produced in the form of a rod which comprises a cladding which comprises fuel pellets and which is closed at the ends thereof by plugs.

The invention claimed is:

1. A fuel rod for a nuclear reactor that is cooled by water, comprising:
 a cylindrical tubular cladding;
 a column of nuclear fuel pellets that are stacked one on top of another inside the tubular cladding in the axial direction of the cladding;
 a first plug for tight closure of a first axial end of the cladding of the rod arranged at a lower portion of the fuel rod when the rod is in an operating position inside the nuclear reactor, the cladding of the rod having an axis vertical; and
 a second plug for tight closure of the second axial end of the cladding, the column of fuel pellets resting on an inner portion of the first plug, referred to as a lower plug, via a first lower end, and being retained inside the tubular cladding by a compression spring that is interposed between a second upper axial end of the column of fuel pellets and an end of an inner portion of the second plug, referred to as the upper plug, wherein the inner portion of the lower plug engaged inside the tubular cladding successively comprises, in the axial direction and in a direction from the first towards the second end of the cladding, a first cylindrical portion that has a diameter that is substantially equal to the inner diameter of the tubular cladding, a second cylindrical portion that has a diameter that is smaller than the inner diameter of the tubular cladding and a third cylindrical portion that has a diameter that is smaller than the inner diameter of the tubular cladding and that is greater than the diameter of the second cylindrical portion so that there remains, between a lateral outer surface of the third cylindrical portion and an inner surface of the tubular cladding, a radial clearance for passage of gas and a substantially planar end surface on which the first end of the column of fuel pellets rests, so that an annular space for expansion of gas is formed between the outer surface of the second portion of the inner portion of the lower plug and the inner surface of the cladding, a volume of the annular space being a function of expansion of gas in the fuel rod during operation,
 wherein the second cylindrical portion of the inner portion of the lower plug has a diameter of between 40% and 60% of the inner diameter of the tubular cladding and a length in the axial direction of between 8 and 10 times the inner diameter of the tubular cladding.

2. The fuel rod according to claim 1, wherein the third cylindrical portion of the inner portion of the lower plug of the fuel rod has a diameter such that there remains, between the outer lateral surface of the third cylindrical portion and the inner surface of the tubular cladding, a radial clearance for assembly and passage of gas of between one and two tenths of a millimeter.

3. The fuel rod according to claim 1, wherein at least a portion of the fuel pellets of the column of fuel pellets comprises one of plutonium oxide and a mixed oxide of uranium and plutonium.

4. The fuel rod according to claim 1, further comprising:
   at least one cross-member in at least one zone of the second cylindrical portion, extending in an axial direction, the at least one cross-member constituted by a diametrically widened cylindrical portion of the second cylindrical portion that has an outer diameter that is substantially equal to the inner diameter of the tubular cladding that is reduced by an assembly clearance.

5. A fuel rod for a nuclear reactor that is cooled by water, comprising:
   a cylindrical tubular cladding;
   a column of nuclear fuel pellets that are stacked one on top of another inside the tubular cladding in the axial direction of the cladding;
   a first plug for tight closure of a first axial end of the cladding of the rod arranged at a lower portion of the fuel rod when the rod is in an operating position inside the nuclear reactor, the cladding of the rod having an axis vertical; and
   a second plug for tight closure of the second axial end of the cladding, the column of fuel pellets resting on an inner portion of the first plug, referred to as a lower plug, via a first lower end, and being retained inside the tubular cladding by a compression spring that is interposed between a second upper axial end of the column of fuel pellets and an end of an inner portion of the second plug, referred to as the upper plug, wherein the inner portion of the lower plug engaged inside the tubular cladding successively comprises, in the axial direction and in a direction from the first towards the second end of the cladding, a first cylindrical portion that has a diameter that is substantially equal to the inner diameter of the tubular cladding, a second cylindrical portion that has a diameter that is smaller than the inner diameter of the tubular cladding and a third cylindrical portion that has a diameter that is smaller than the inner diameter of the tubular cladding and that is greater than the diameter of the second cylindrical portion so that there remains, between a lateral outer surface of the third cylindrical portion and an inner surface of the tubular cladding, a radial clearance for passage of gas and a substantially planar end surface on which the first end of the column of fuel pellets rests, so that an annular space for expansion of gas is formed between the outer surface of the second portion of the inner portion of the lower plug and the inner surface of the cladding,
   wherein at least a portion of the fuel pellets of the column of fuel pellets comprises one of plutonium oxide and a mixed oxide of uranium and plutonium,
   wherein the second cylindrical portion of the inner portion of the lower plug has a diameter of between 40% and 60% of the inner diameter of the tubular cladding and a length in the axial direction of between 8 and 10 times the inner diameter of the tubular cladding.

* * * * *